Aug. 15, 1950     W. B. SHANK ET AL     2,519,323
METHOD OF MEASURING CORROSION AND EROSION
Filed Sept. 2, 1944
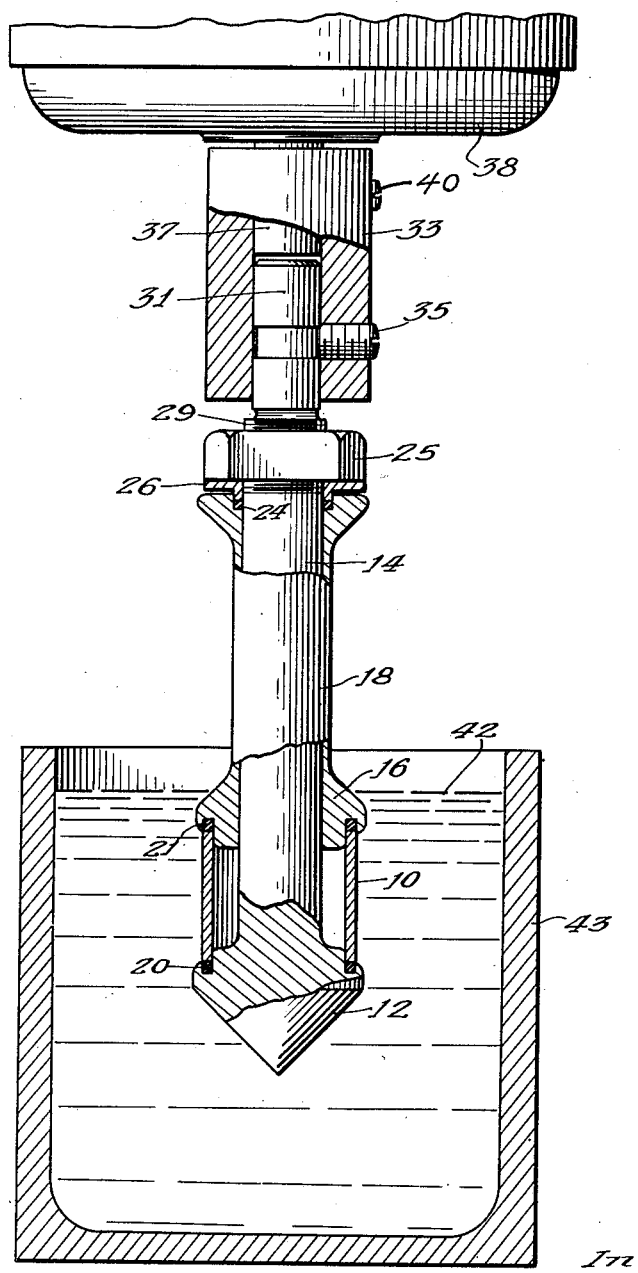
Inventor:
Walter B. Shank
David H. Gurinsky
Edward C. Creutz
By
Attorney Patented Aug. 15, 1950

2,519,323

UNITED STATES PATENT OFFICE 2,519,323

METHOD OF MEASURING CORROSION AND EROSION

Walter B. Shank, David H. Gurinsky, and Edward C. Creutz, Chicago, Ill., assignors to the United States of America as represented by the United States Atomic Energy Commission Application September 2, 1944, Serial No. 552,554

1 Claim. (Cl. 73—86)

This invention is directed to a method for measuring corrosion and erosion and is more particularly directed to the measurement of corrosion and erosion of a solid subjected to a corrosive fluid flowing past the solid at appreciable velocities.

Before building equipment for handling fluids known to be corrosive or erosive it is highly desirable to know the effect the fluid in question will have on the various parts with which it comes in contact. For example, it may be known that a certain rate of flow is required through a pipe or conduit and that a particular minimum time between repairs or replacements of the pipe is desired. Knowledge of the rate of wear of pipe of a certain material will then permit the selection of a pipe of the proper dimensions. Likewise, if the problem is that of limiting contamination of the fluid, it is desirable to measure the effects of corrosion and erosion on a number of possible pipe materials in order to select the best possible material.

One of the objects of the invention is to provide a method for measuring the rate of wear of a solid when subjected to flow of a corrosive fluid or fluid-like medium.

Another object of the invention is to provide a method and device for measuring the rate of wear of a solid over which a medium is flowing at a predetermined velocity.

Another object is to provide a method which will permit accurate determination of the rate of corrosion and erosion of liquids flowing at a predetermined velocity by placing a predetermined area of a solid to be tested in contact with a fluid or other medium at such predetermined velocity for a predetermined time.

In the drawing, a hollow cylindrically shaped test specimen 10 of the particular solid to be tested is clamped between the enlarged lower end 12 of a spindle 14 and an enlarged lower end 16 of a sleeve 18 which fits over the spindle 14 and is slidable with respect thereto. Sealing rings 20 and 21 are carried in annular grooves cut in the enlarged ends 12 and 14, respectively of the spindle 14 and the sleeve 18. Rubber or synthetic rubber sealing rings 20 and 21 engage the ends of the cylindrical test specimen 10 to prevent entry of fluid into the interior thereof.

As a further precaution against the possibility of the entry of any corrosive fluid into the interior of the test specimen 10, a sealing ring 24 is provided between the spindle 14 and the upper end of the sleeve 18. A gland 26 is forced against the packing ring 24 by a nut 25; the nut 25 being movable on a threaded portion 29 of the spindle 14.

When the nut 25 is screwed downwardly on the spindle 14, not only does the gland 26 compress the sealing ring 24 to seal the junction between the spindle 14 and the sleeve 18, but the sleeve 18 is also forced downwardly to compress the sealing rings 20 and 21 to seal the test specimen 10 between the enlarged portions 12 and 16 of the spindle 14 and the sleeve 18. Thus it is apparent that a single adjustment of the nut 25 on the spindle 14 serves to seal the device so that no fluid may enter the interior of the test specimen 10. This adjustment of the nut 25 also serves to compensate for variations in the length of the test specimen 10.

The upper end of the spindle 14 terminates in a shank 31 which is carried in a coupling 33 and secured therein by a set screw 35. The coupling 33 connects the spindle 14 to a shaft 37 of an electric motor 38, the coupling 33 being secured to the shaft 37.

The test specimen 10, carried by the spindle 14 and the sleeve 18, is immersed in a liquid bath 42 that is contained within a receptacle 43. The bath 42 constitutes the medium whose corrosive and erosive effect on the test specimen 10 is to be determined. While the medium is herein described as a liquid, it may be a gas such as steam, fluorine, chlorine or other corrosive gas or a solid composed of particles small enough to flow more or less as a liquid. Likewise the medium may be in the nature of a quasi liquid such as an emulsion, a slurry or any of numerous suspensions for example, milk.

In operation the test specimen 10 is accurately weighed prior to running the test. The specimen 10 is placed over the spindle 14 and into engagement with the sealing ring 20 and the sleeve 18 is slid over the spindle 14 until the sealing ring 21 engages the upper edge of the test specimen 10. The sealing ring 24 and the gland 26 are placed on the spindle and the nut 25 screwed downwardly on the threads 29 to exert a compressive force on the sealing rings 20 and 21 and on the sealing ring 24 to effectively seal the inside of the test specimen 10 against the entry of any corrosive substance.

The above mentioned assembly is inserted in the coupling 33, the set screw 35 tightened and the electric motor 38 placed in operation with the test specimen immersed in the bath 42. The specimen 10 is rotated at a constant velocity and preferably at a relatively constant temperature in the bath 42 for a sufficiently long period of time and/or for a sufficient number of revolutions to give the necessary indication of the effect of the bath on the specimen.

When the desired time has elapsed the specimen 10 is removed from the bath and the device disassembled. The test specimen 10 is again weighed and the loss in weight due to corrosion and erosion by the material of bath 42 determined by comparison with its weight prior to the test. Since the interior of the cylindrical test specimen 10 is effectively sealed against the entry of corrosive fluids as described above, the entire change of weight of the test specimen is known to be due to loss of material on the outer surface thereof. This surface is of known area and therefore the results of the test provide accurate data for comparison with the results of the tests of specimens of various other materials at the same velocity.

The lineal distance traversed by the surface of the test specimen 10 with respect to the bath 42 may be estimated from the speed of the motor 38 and the diameter of the test specimen. However, a more satisfactory method is to construct a test specimen of a material whose performance with respect to the material of the bath 42 is known, and then compare the loss of weight of that material and loss of the material of the specimen in question for a test substantially identical in speed, temperature conditions, and duration. Likewise, it may be desirable to run similar tests on various materials in order to select the one that stands up the best. Frequently it is found advantageous to study the rate of corrosion of a material at different velocities. In such a case the test may be repeated changing the velocity with each test while holding other factors substantially constant.

In order to secure accurate comparative data it is generally necessary to conduct the tests under substantially identical conditions. The degree of identity of conditions necessary will depend upon the corrosive nature of the liquid or other medium being studied. Thus with certain liquids the corrosive character thereof changes substantially with temperature variations as little as 5° C. On the other hand other substances exert a more constant corrosive action over a much wider temperature range. The same is true with respect to variation in concentration of solutions used and of other factors. Consequently, a single test or series of tests should be conducted using such control of the conditions, such as temperature, pressure, concentration etc., as may be required to insure reproducible results.

While the device and its operation have been described in connection with a test specimen of cylindrical form, it is apparent that various other shapes could be employed without departing from the spirit of the invention. Further, it is apparent that the purpose of the apparatus and method herein described is to determine the wear due to the combined effects of corrosion and erosion of a particular material on a particular solid. In certain instances there may be negligible corrosive effect and the result of the test will indicate only the effects of erosion. In other cases the effects of erosion may be negligible.

The term fluid, as used in the claim, is intended to include not only true fluids but also any emulsion, suspension, slurry, or solid which is capable of being handled as a fluid, i. e., a substance which can be transmitted through pipes, pumped, etc., as fluids are commonly handled.

We claim:

The method of measuring the eroding and corroding effect of a fluid on a solid material which comprises rotating a hollow cylindrical body of the solid material in a quantity of the fluid with only the outer side walls of the cylinder exposed to the fluid, and weighing the solid material before and after the exposure to the fluid.

WALTER B. SHANK,
*My name is W. Bradford Shank.*
DAVID H. GURINSKY.
EDWARD C. CREUTZ.

REFERENCES CITED

The following references are of record in the file of this patent:

UNITED STATES PATENTS

| Number | Name | Date |
|---|---|---|
| 1,444,803 | Ratner et al. | Feb. 13, 1923 |
| 1,683,489 | Rice | Sept. 4, 1928 |
| 2,274,541 | Fontana et al. | Feb. 24, 1942 |
| 2,315,845 | Ferris | Apr. 6, 1943 |

FOREIGN PATENTS

| Number | Country | Date |
|---|---|---|
| 578,387 | Germany | June 13, 1933 |